US012752246B2

(12) United States Patent
Zhou et al.

(10) Patent No.: US 12,752,246 B2
(45) Date of Patent: Oct. 6, 2026

(54) SYSTEM FOR FULLY IMPLEMENTING AUTOMATED LIQUID DISPENSING ON MULTIPLE RELAY TANKS

(71) Applicant: LISURE SCIENCE (SUZHOU) CO., LTD., Suzhou (CN)

(72) Inventors: Sheng Zhou, Suzhou (CN); Zuwei Jin, Suzhou (CN); Huixin Xu, Suzhou (CN); Xiaowei Hu, Suzhou (CN); Yan Sun, Suzhou (CN)

(73) Assignee: LISURE SCIENCE (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 19/132,397

(22) PCT Filed: May 26, 2023

(86) PCT No.: PCT/CN2023/096444
§ 371 (c)(1),
(2) Date: May 23, 2025

(87) PCT Pub. No.: WO2024/108948
PCT Pub. Date: May 30, 2024

(65) Prior Publication Data

US 2026/0192262 A1 Jul. 9, 2026

(30) Foreign Application Priority Data

Nov. 25, 2022 (CN) ........................ 202211492732.8

(51) Int. Cl.
*B01F 23/40* (2022.01)
*B01F 33/84* (2022.01)
(Continued)

(52) U.S. Cl.
CPC ........... *B01F 23/49* (2022.01); *B01F 33/848* (2022.01); *B01F 35/10* (2022.01);
(Continued)

(58) Field of Classification Search
CPC .......... B01F 23/49; B01F 35/10; B01F 35/22; B01F 35/2112; B01F 35/2202; B01F 35/221; B01F 35/716; B01F 33/848
(Continued)

(56) References Cited

U.S. PATENT DOCUMENTS 3,845,787 A * 11/1974 Slagle .................... B67D 1/102 222/130
3,891,123 A * 6/1975 Blackburn .............. D06F 34/08 222/64
(Continued)

FOREIGN PATENT DOCUMENTS

CN 209476220 U 10/2019
CN 113856520 A 12/2021
(Continued)

*Primary Examiner* — Minh Q Le
(74) *Attorney, Agent, or Firm* — Bayramoglu Law Offices LLC

(57) ABSTRACT

The provided is a system for fully automatically implementing automated liquid dispensing on multiple relay tanks. The system includes a plurality of concentration preparation tanks, a plurality of concentration tanks, a water-for-injection filling tank, an online dilution system and a plurality of relay tanks. Each concentration preparation tank is connected to a plurality of the concentration tanks, the number of the concentration tanks connected to each concentration preparation tank being same; each concentration tank and the water-for-injection filling tank are both connected to each relay tank via the online dilution system. The system for fully automatically implementing automated liquid dispensing on multiple relay tanks can further reduce the sizes of the relay tanks, thereby reducing the whole area for buffer solution preparation, and satisfying the demand of short time for customers.

10 Claims, 2 Drawing Sheets

(51) Int. Cl.
*B01F 35/10* (2022.01)
*B01F 35/21* (2022.01)
*B01F 35/22* (2022.01)
*B01F 35/221* (2022.01)
*B01F 35/71* (2022.01)

(52) U.S. Cl.
CPC .......... *B01F 35/2112* (2022.01); *B01F 35/22* (2022.01); *B01F 35/2202* (2022.01); *B01F 35/221* (2022.01); *B01F 35/716* (2022.01)

(58) Field of Classification Search
USPC .......................... 137/255, 256, 263, 266, 571
See application file for complete search history.

(56) References Cited

U.S. PATENT DOCUMENTS 4,015,628 A * 4/1977 Randolph ............... B01F 23/59 137/565.31
4,284,210 A * 8/1981 Horak ..................... G01F 11/28 222/14
4,320,775 A * 3/1982 Stirling ............... G01F 23/0038 137/101.25
4,440,315 A * 4/1984 Slobodnik ................ G03C 5/31 141/238
4,561,566 A * 12/1985 Slobodnik .............. G03D 3/065 222/638
4,720,024 A * 1/1988 Jongerius ................ G01F 11/28 222/14
5,316,181 A * 5/1994 Burch .................. G05D 7/0688 222/61
5,690,252 A * 11/1997 Oleksiewicz ........... B01F 33/85 285/124.1
6,669,052 B2 * 12/2003 Barbe ..................... D06F 33/37 222/651
7,201,178 B2 * 4/2007 Gupta .................. G05D 7/0635 137/434
7,201,179 B2 * 4/2007 Barr ..................... G05D 11/135 137/255
7,357,142 B2 * 4/2008 Merkle ................. A61M 1/782 137/101.25
7,725,970 B2 * 6/2010 Tuttle .................... D06F 39/022 68/12.22
8,507,382 B2 * 8/2013 Hughes ................... B24B 57/02 438/692
2021/0197150 A1 * 7/2021 Brandt ................ B01F 35/2132
2021/0199679 A1 7/2021 Seal et al.
2026/0072052 A1 * 3/2026 Hinz .................. G01N 35/1016

FOREIGN PATENT DOCUMENTS

| | | | |
|---|---|---|---|
| CN | 215963289 | U | 3/2022 |
| CN | 116139755 | A | 5/2023 |
| GB | 0220241 | | 10/2002 |

* cited by examiner

SYSTEM FOR FULLY IMPLEMENTING AUTOMATED LIQUID DISPENSING ON MULTIPLE RELAY TANKS

CROSS-REFERENCE TO THE RELATED APPLICATIONS

This application is the national phase entry of International Application No. PCT/CN2023/096444, filed on May 26, 2023, which is based upon and claims priority to Chinese Patent Application No. 202211492732.8, filed on Nov. 25, 2022, the entire contents of which are incorporated herein by reference.

TECHNICAL FIELD

The present invention relates to the field of biopharmaceuticals, and in particular to is a system for fully automatically implementing automated liquid dispensing on multiple relay tanks.

BACKGROUND

A downstream biopharmaceutical process involves chromatographic separation and purification processes, so buffer solution preparation is required. At present, traditional pharmaceutical factories usually adopt the following preparation methods of the buffer solution. The first method is to prepare the required buffer solution separately and store the buffer solution in a tank. Therefore, in order to prepare a required volume of the buffer solution, the tans used are usually large, with volumes generally ranging from 400 L to 5000 L. Furthermore, separate tanks are required when different buffer solutions need to be prepared, resulting in some disadvantages such as an increased number and volume of tanks, greater space in a clean area of the factory, and higher operational costs.

The second method involves a single online buffer solution system, through which a solution in a stock solution tank is directly delivered to a chromatography system (a user end) via an online solution preparation system. However, a preparation system established by this method is fixed and cannot be readily adapted for different production scenarios, thereby significantly limiting its scope of application. Moreover, this method suffers from slow conversion of buffer solution, pressure fluctuations, low preparation efficiency, which prevents a prompt response to user demands, and slows down a process.

The third method is the one described in the Chinese Patent (Publication No.: CN215963289U) titled Buffer Solution Preparation System, the patent describes the following method: a concentrated solution with a predetermined concentration is distributed in a solution preparation tank, the solution is delivered via pipelines to different water-for-injection filling tanks with different concentrated solutions, the solution with the corresponding concentration is then prepared according to a formulation ratio of the solution required by the chromatography system, and the solution is then delivered to the water-for-injection filling tanks; and the concentrated solution is diluted and prepared to the buffer solution with the required concentration through an intermediate preparation tank and delivered to the water-for-injection filling tanks. The method further reduces a volume of the tank, but results in the following disadvantages: since the preparation is performed through the intermediate preparation tank rather than a fully online preparation system, the water-for-injection filling tanks at a use point must still have a minimum volume of 250 L, the preparation efficiency of the intermediate preparation tank is lower, and a volume of the water-for-injection filling tanks is limited.

SUMMARY

In order to solve the above problems, the present invention provides a system for fully automatically implementing automated liquid dispensing on multiple relay tanks.

In an aspect, the present invention provides a system for fully automatically implementing automated liquid dispensing on multiple relay tanks, including a plurality of concentration preparation tanks, a plurality of concentration tanks, an water-for-injection filling tank, an online dilution system and a plurality of relay tanks; each concentration preparation tank is connected to a plurality of the concentration tanks, a number of the concentration tanks connected to each concentration preparation tank being same; each concentration tank and the water-for-injection filling tank are both connected to each relay tank via the online dilution system.

In some embodiments, the system further includes a cleaning-in-place (CIP) system, where the CIP system is connected to each concentration tank and each relay tank, with the benefit of facilitating the cleaning of the concentration tanks and the relay tanks.

In some embodiments, a number of the concentration preparation tanks is 2-4, with the benefit of defining an appropriate number of the concentration preparation tanks.

In some embodiments, a number of the concentration tanks connected to each concentration preparation tank is 2-4, with the benefit of defining an appropriate number of the concentration tanks.

In some embodiments, a number of the relay tanks is 4-10, with the benefit of defining an appropriate number of the relay tanks.

In some embodiments, the online dilution system includes a controller, an inlet valve array, and an outlet valve array connected to each other, where the inlet valve array includes a plurality of inlet branches, and the outlet valve array includes a plurality of outlet branches, and each outlet branch is connected to one corresponding relay tank, with the benefit of describing a structure of the online dilution system.

In some embodiments, each inlet branch is provided with a pump, a valve, a flow sensor, and a pressure sensor, with the benefit of allow for precise hydraulic control of the solution flow rate.

In some embodiments, each relay tank is provided, from bottom to top, with a first liquid level, a second liquid level, a third liquid level, and a stop liquid level, and thresholds corresponding to the liquid levels are preset in the controller, with the benefit of defining a method for layering the liquid levels in the relay tank.

In some embodiments, each relay tank is further provided with an alarm liquid level, and the alarm liquid level is located below the first liquid level, with the benefit of issuing an alarm timely when the liquid level of the solution in the relay tank is low.

In some embodiments, each relay tank is provided with a liquid level meter, with the benefit of monitoring the liquid level in the relay tank in real time through the liquid level meter.

Figure 1:
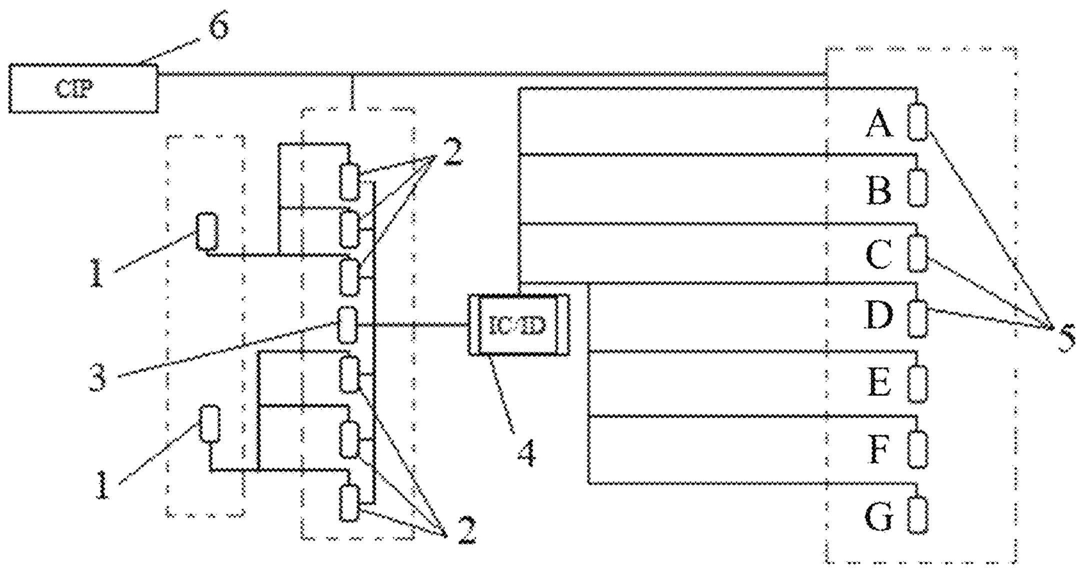
FIG. 1 is a schematic structural diagram of a system for fully automatically implementing automated liquid dispensing on multiple relay tanks according to an embodiment of the present invention.

Reference numerals in the accompanying drawings: 1. concentration preparation tank; 2. concentration tank; 3. water-for-injection filling tank; 4. online dilution system; 5. relay tank; 6. cleaning-in-place system; 51. first liquid level; 52. second liquid level; 53. third liquid level; 54. stop liquid level; 55. alarm liquid level; 41. inlet valve array; 42. outlet valve array; 43. inlet branch; 44. outlet branch; 45. pump; 46. valve; 47. flow sensor; and 48. pressure sensor.

DETAILED DESCRIPTION OF THE EMBODIMENTS

The present invention will be further described in detail below with reference to accompanying drawings.

Figure 2:
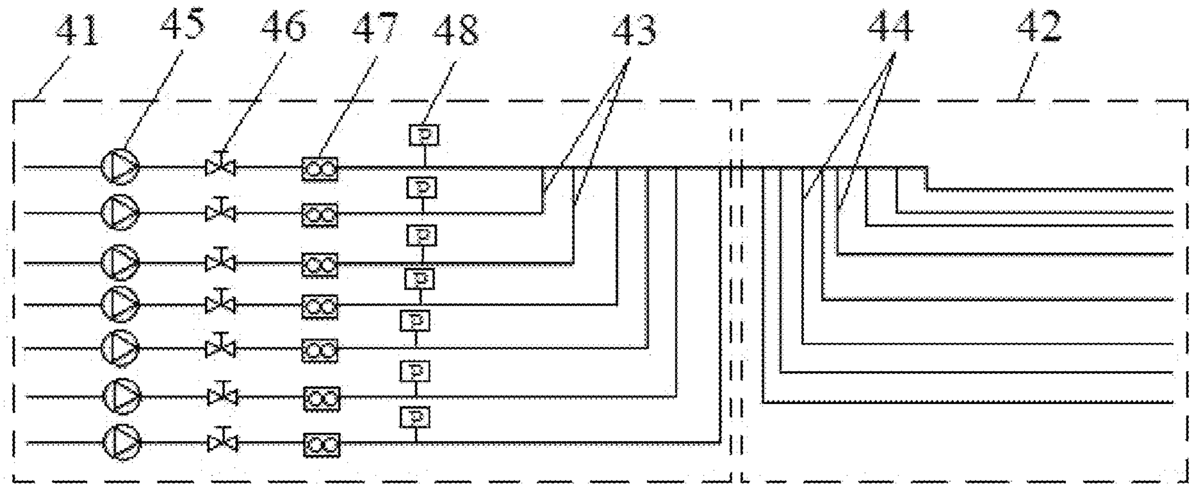
FIG. 2 is a schematic structural diagram of the online dilution system in FIG. 1.
Figure 3:
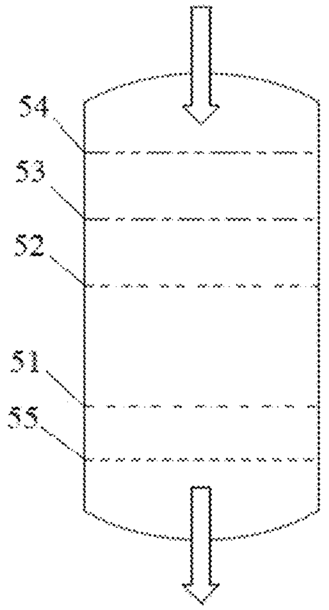
FIG. 3 is a schematic structural diagram of the relay tank in FIG. 1.
Figure 4:
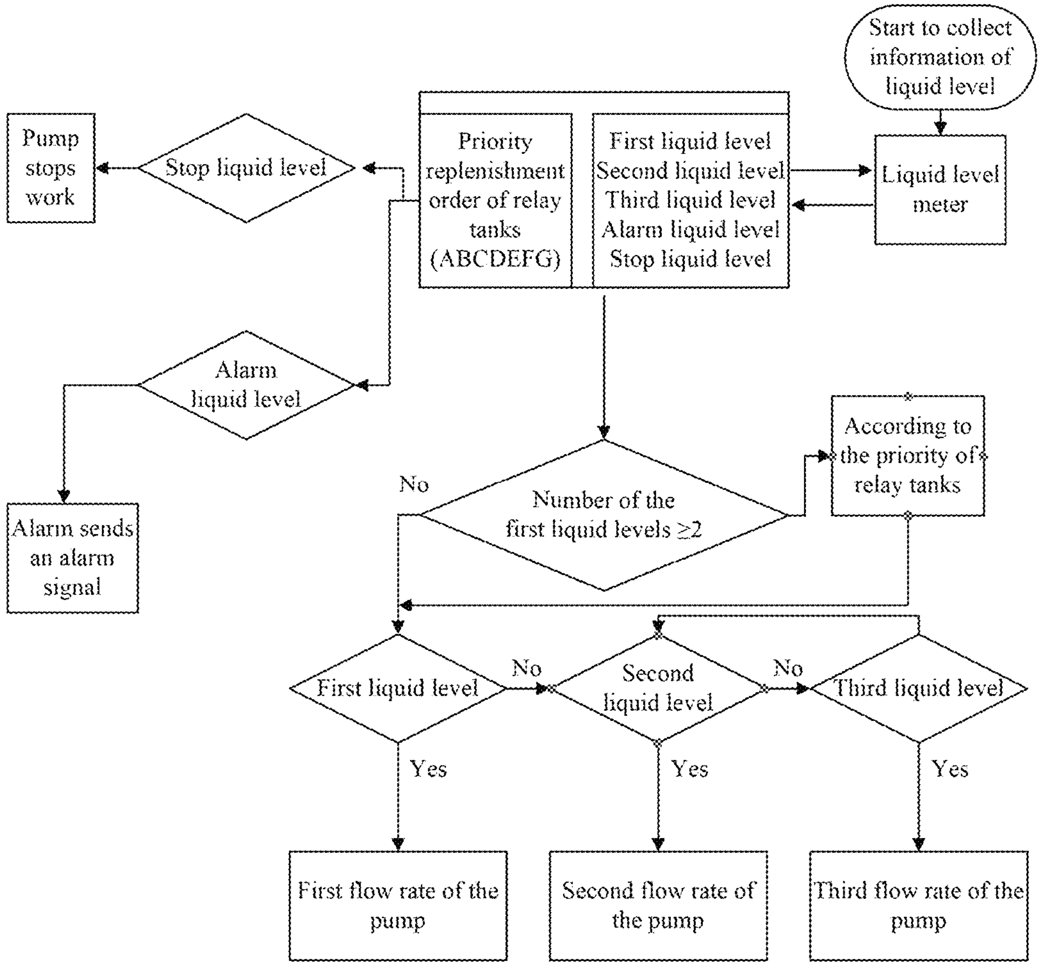
FIG. 4 is a control logic diagram of the online dilution system in FIG. 1.

FIG. 1 schematically illustrates a structure of a system for fully automatically implementing automated liquid dispensing on multiple relay tanks according to one embodiment of the present invention. FIG. 2 illustrates a structure of the online dilution system in FIG. 1. FIG. 3 illustrates a structure of the relay tank in FIG. 1, and FIG. 4 illustrates control logic of the online dilution system in FIG. 1.

As shown in FIG. 1, the system includes a plurality of (preferably 2-4, two are used in this embodiment) concentration preparation tanks 1 and a water-for-injection filling tank 3. Each concentration preparation tank 1 is configured to be filled with a weak acid and its corresponding salt solution, or a weak base and its corresponding salt solution, such as citric acid-disodium hydrogen phosphate or ammonia-ammonium chloride buffer solution. Specifically, each of the two concentration preparation tanks 1 is connected to a plurality of (preferably 2-4, three are used in this embodiment, therefore, a total of six ones are used) concentration tanks 2, such that each concentration preparation tank 1 can deliver a solution therein to the respective concentration tanks 2 connected thereto.

The water-for-injection filling tank 3 is filled with water for injection and is connected to each of the concentration preparation tanks 1 and the concentration tanks 2, and is configured to prepare weak acid solution, and weak base solutions with different concentrations and their respective salt solutions. In addition, each of the concentration tanks 2 and the water-for-injection filling tank 3 are connected to a plurality of (preferably 4-10, eight are used in this embodiment) relay tanks 5 via an online dilution system 4 (IC/ID).

Further, the concentration tanks 2 and the relay tank 5 are each connected to a cleaning-in-place (CIP) system, and the CIP system is configured to clean the concentration tanks 2 and the relay tanks 5.

As shown in FIG. 2, the online dilution system 4 mainly includes a controller, an inlet valve array 41, and an outlet valve array 42, and the inlet valve array 41 is connected to the outlet valve array 42. Specifically, the inlet valve array 41 includes a plurality of inlet branches 43 (equal in number to a number of the relay tanks 5); each inlet branch 43 is connected to an outlet of a main liquid inlet pipe of the online dilution system 4, that is, the inlet branch is configured to input solutions delivered by each concentration tanks 2 and the water-for-injection filling tank 3; and the outlet valve array 42 includes a plurality of outlet branches 44 (also equal in number to the number of the relay tanks 5), and each outlet branch 44 is connected to an inlet end of the corresponding relay tank 5.

In addition, each inlet branch 43 is provided with a pump 45, a valve 46, a flow sensor 47, and a pressure sensor 48, which can be used for precise flow control, that is, the solutions are controlled to flow through at different flow rates by adjusting powers of the pump 45.

As shown in FIGS. 3-4, each relay tank 5 is provided, from bottom to top, with an alarm liquid level 55, a first liquid level 51, a second liquid level 52, a third liquid level 53, and a stop liquid level 54, and thresholds corresponding to the above liquid levels are preset in the controller.

Further, each relay tank 5 is provided with a level meter for collecting information of the liquid levels of the buffer solution inside the relay tank 5.

When the system is used, each concentration preparation tank 1 is first filled with a weak acid (or weak base) solution and its corresponding salt solution, the solution in each concentration preparation tank 1 is delivered to the corresponding concentration tanks 2 according to a predefined concentration, and then injected into each concentration tank 2 through the water-for-injection filling tank 3 loaded with the water for injection, such that weak acid (or weak base) solutions at different ratios and their respective salt solutions are prepared in the concentration tanks 2.

The solutions are then pumped from the concentration tanks 2 and the water-for-injection filling tank into the main liquid inlet pipe via the online dilution system 4 according to a given formulation, and then delivered to the relay tanks 5 after being mixed in a mixer, and buffer solutions of different concentrations are delivered into different relay tanks 5 until the relay tanks 5 are fully filled.

In this case, the online dilution system 4 ceases operation, and the buffer solution in each relay tank 5 is sufficient to meet a customer's operating volume for 5-10 min. Since each relay tank 5 is provided with the liquid level meter, and different amounts of buffer solution are used in different relay tanks 5, the liquid level meter transmits the information to a central controller, and the central controller determines a priority replenishment order according to remaining volumes in the relay tanks 5. Specifically, the central controller is configured to control the pumps 45 of the online dilution system 4, and deliver weak acid and salt solutions of different concentrations in different concentration tanks 2 according to a formulation ratio, and the solutions are mixed in the liquid inlet pipe through a mixer and then delivered to the corresponding relay tanks 5, and the relay tanks 5 are replenished with the buffer solutions sequentially according to the priority replenishment order.

As shown in FIG. 4, the liquid level meter can compare the collected information with a built-in threshold value in the controller to timely replenish the buffer solution in the corresponding relay tanks 5. A specific method is as follows.

When the liquid level of only one of the relay tank 5 reaches the first liquid level 51, the controller sends a liquid replenishment request signal to the corresponding relay tank 5, the online dilution system 4 is then activated, the pump 45 of the corresponding concentration tank 2 of the online dilution system 4 is opened according to the formulation requirements, and the weak acid (or base) solution and its corresponding salt solution in the concentration tank is then controlled to enter the relay tank 5 via the online dilution system 4, and an inflow rate of the solution is set to 1.5-2 times (that is, a first flow rate, which may be set to 1.5 times, 1.6 times, 1.7 times, 1.8 times, 1.9 times, or 2 times), and the relay tank 5 is quickly replenished with the buffer solution, and the liquid level raises. When the liquid level of the relay tank 5 reaches the second liquid level 52, the inflow rate of the inflow buffer solution is slightly faster than an outflow rate by 5-10% (that is, a second flow rate), and a replenishment rate of the buffer solution slows down, causing the liquid level to rise more slowly. When the liquid level of the relay tank 5 reaches the third liquid level 53, the inflow rate of the inflow buffer solution is slightly slower than an outflow rate by 5-10% (that is, a third flow rate), and the liquid level of the buffer solution presents a lowering trend.

Further, when the liquid level of the relay tank 5 reaches the alarm liquid level 55, an alarm will be issued in a timely manner.

Specifically, when the buffer solution in one relay tank 5 is always in use, the liquid level generally fluctuates between the second liquid level 52 and the third liquid level 53. When the buffer solution in the relay tank 5 is not in use, the buffer solution only flows into but not flows out of the relay tank, causing the liquid level to rise continuously. When the liquid level reaches the stop liquid level 54, the controller stops the corresponding pump 45 to stop working, and the relay tank 5 is in a dormant state to wait for the buffer solution in the relay tank to be used again.

When the liquid levels of two or more of the relay tanks 5 simultaneously reach the first liquid level 51, a user needs to prioritize the replenishment order according to the usage of buffer solutions in the relay tanks or the priority of the relay tanks 5. For example, the seven relay tanks 5 in FIG. 1 may be ranked in sequence from top to bottom (or according to an order of use) as ABCDEFG.

For example, when the two relay tanks 5 at positions C and D both reach the first liquid level 51 at the same time, the controller will first send a liquid replenishment request signal to the relay tank at the position C, and control the online dilution system 4 to activate, and the relay tank at the position C is replenished with the solution until the liquid level of the relay tank at the position C reaches the stop liquid level 54; and the controller will then send a liquid replenishment request signal to the relay tank at the position D, the above replenishment process will be repeated until the tanks at the position D reaches the stop liquid level 54.

The foregoing merely describes some embodiments of the present invention. Those of ordinarily skilled in the art may make several creative transformations and improvements on the premise without deviating from concepts of the present invention, these transformations and improvements should be considered to fall within the protection scope of the present invention.

What is claimed is:

1. A system for fully automatically implementing automated liquid dispensing on multiple relay tanks, comprising a plurality of concentration preparation tanks, a plurality of concentration tanks a water-for-injection filling tank, an online dilution system and a plurality of relay tanks, wherein each of the plurality of concentration preparation tanks is connected to the plurality of concentration tanks, a number of the plurality of concentration tanks connected to each of the plurality of concentration preparation tanks is same, and each of the plurality of concentration tanks and the water-for-injection filling tank are both connected to each of the plurality of relay tanks via the online dilution system.

2. The system according to claim 1, further comprising a cleaning-in-place (CIP) system, wherein the CIP system is connected to each of the plurality of concentration tanks and each of the plurality of relay tanks.

3. The system according to claim 1, wherein a number of the plurality of concentration preparation tanks is 2-4.

4. The system according to claim 3, wherein the number of the plurality of concentration tanks connected to each of the plurality of concentration preparation tanks is 2-4.

5. The system according to claim 1, wherein a number of the plurality of relay tanks is 4-10.

6. The system according to claim 1, wherein the online dilution system comprises a controller, an inlet valve array, and an outlet valve array connected to each other, the inlet valve array comprises a plurality of inlet branches, the outlet valve array comprises a plurality of outlet branches, and each of the plurality of outlet branches is connected to one corresponding relay tank.

7. The system according to claim 6, wherein each of the plurality of inlet branches is provided with a pump, a valve, a flow sensor, and a pressure sensor.

8. The system according to claim 6, wherein each of the plurality of relay tanks is provided, from bottom to top, with a first liquid level, a second liquid level, a third liquid level, and a stop liquid level, and thresholds corresponding to the first, second, third, and stop liquid levels are preset in the controller.

9. The system according to claim 8, wherein the relay tank is further provided with an alarm liquid level, and the alarm liquid level is located below the first liquid level.

10. The system according to claim 9, wherein the relay tank is provided with a liquid level meter.

* * * * *